(12) United States Patent
Woo

(10) Patent No.: US 6,408,183 B1
(45) Date of Patent: Jun. 18, 2002

(54) METHOD OF DEMANDING REGISTRATION OF A WIRELESS LOCAL LOOP TERMINAL

(75) Inventor: Jung-Oh Woo, Kyongsangbuk-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/337,377

(22) Filed: Jun. 21, 1999

(30) Foreign Application Priority Data

Jun. 20, 1998 (KR) .............................. 98-23291

(51) Int. Cl.[7] ................................................ H04Q 7/20
(52) U.S. Cl. .................. 455/435; 435/412; 435/566
(58) Field of Search ............................... 455/435, 432, 455/403, 566, 412, 3.01, 418, 419, 423, 67.1

(56) References Cited

U.S. PATENT DOCUMENTS

| | | | | |
|---|---|---|---|---|
| 5,257,406 A | * | 10/1993 | Ito ............................... 455/566 |
| 5,305,466 A | * | 4/1994 | Taketsugu .................... 455/435 |
| 5,475,735 A | * | 12/1995 | Williams et al. ............. 455/435 |
| 5,577,103 A | * | 11/1996 | Foti ............................. 455/435 |
| 5,586,185 A | * | 12/1996 | Shibata et al. ................ 380/21 |
| 5,655,219 A | * | 8/1997 | Jusa et al. .................... 455/435 |
| 5,710,985 A | * | 1/1998 | Matsumoto .................... 455/89 |
| 5,794,144 A | * | 8/1998 | Comer et al. ................ 455/435 |
| 5,857,157 A | * | 1/1999 | Shindo ......................... 455/556 |
| 5,943,425 A | * | 8/1999 | Mizikovsky ................. 455/418 |

* cited by examiner

Primary Examiner—William Trost
Assistant Examiner—Simon Nguyen
(74) Attorney, Agent, or Firm—Dilworth & Barrese, LLP

(57) ABSTRACT

A method of demanding registration of a Wireless Local Loop (WLL) terminal by displaying a message on a display comprising the steps of detecting whether the power is turned on, detecting whether a registered electronic serial number (ESN) and phone number are stored in a memory, and displaying the message which demands registration when no registered identification data is detected.

10 Claims, 2 Drawing Sheets

METHOD OF DEMANDING REGISTRATION OF A WIRELESS LOCAL LOOP TERMINAL

CLAIM OF PRIORITY

This application makes reference to, incorporates the same herein, and claims all benefits accruing under 35 U.S.C. §1.19 from an application entitled METHOD OF DISPLAYING A MESSAGE TO DEMAND REGISTRATION ON A WIRELESS LOCAL LOOP TERMINAL earlier filed in the Korean Industrial Property Office on Jun. 20, 1998, and there duly assigned Serial No. 23291/1998.

BACKGROUND OF THE INVENTION

1. Field of the Invention

The present invention relates to a method of demanding registration of a WLL (Wireless Local Loop) by displaying a message on a display when the terminal is not registered with a communication service provider.

2. Description of the Related Art

A WLL terminal typically displays various messages including the received electric field strength, present time and date, etc. However, the terminal does not indicate whether it is registered with a communication service company or not. Hence, when a user attempts to establish a communication through a WLL terminal which is not registered with a communication service company, the terminal will not work. The user may then wrongly assume that the terminal is malfunctioning or the base station can not provide proper services.

SUMMARY OF THE INVENTION

It is therefore an object of the present invention to provide a method of demanding registration of a WLL terminal by displaying a message on a display of the terminal when the terminal is not registered with a communication service company.

In accordance with an embodiment of the present invention, a method of demanding registration of a WLL terminal with a memory by displaying a message on a display, comprises the steps of: detecting whether the power is turned on; detecting whether a registered electronic serial number (ESN) and phone number are stored in the memory; and displaying a message which demands registration when no registered identification number is stored in the memory.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF PREFERRED EMBODIMENTS

Figure 1:
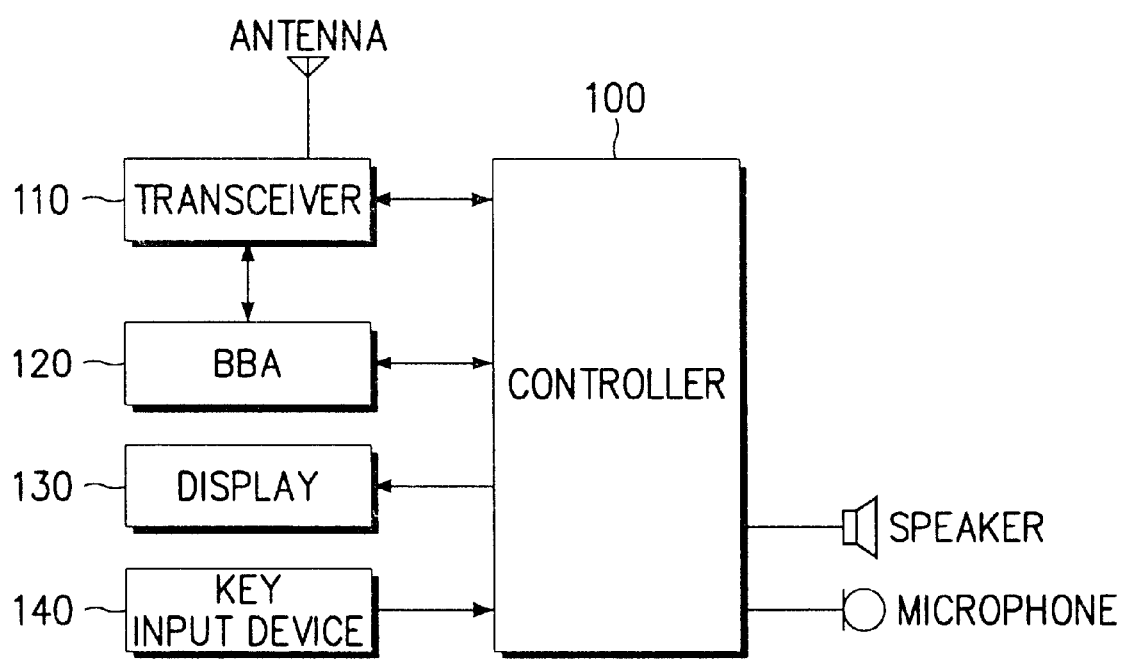
FIG. 1 is a block diagram illustrating the structure of a WLL terminal in accordance with the present invention.

Referring to FIG. 1, a WLL terminal comprises a controller 100, a transceiver 110, a base band analog circuit (BBA) 120, a display 130 and a key input device 140. The controller 100 is a mobile station modem (MSM) which preferably includes an Intel 80186 CPU as a core element, for use in a CDMA (Code Division Multiple Access) PCS (Personal Communication System). The MSM is comprised of a RAM, a ROM and a EEPROM, and controls the functions of the terminal in response to a clock signal CLK from the BBA 120. The ROM stores a program for controlling the terminal, and the RAM stores flag information, call processing data, timer data, etc. The EEPROM stores the name, power level, volume label, ESN, phone number, etc. The ESN is an identification number which identifies the terminal when the terminal is connected with the base station, and is different from the general phone number. The ESN and phone number are provided by the communication service provider, and when stored in memory are a form of registered identification data.

The transceiver 110 essentially comprises a power amplifier, a drive amplifier, an up/down converter, a buffer, a tx/rx intermediate automatic gain control amplifier, a radio frequency band pass filter, and an intermediate saw band pass filter. The power amplifier is used to amplify a signal transmitted from the terminal to the base station. The drive amplifier is used to deliver a signal of sufficient level to the power amplifier. The up/down converter is used to increase or decrease the frequency of a signal transmitted or received. The buffer serves as an amplifier to deliver a signal to the local input of the up/down converter, the signal being phase-locked between the voltage controlled oscillator and the PLL (Phase-Locked Loop). The transceiver 110 includes a duplexer for separating the transmitted signal and the received signal and a thermistor providing compensation for temperature changes.

The BBA 120 essentially comprises an analog to digital converter, a digital to analog converter, a low pass filter, and a divider voltage controlled oscillator. The BBA 120 is used to connect the transceiver 110 with the controller 100. A signal received by the transceiver 110 is transferred through an intermediate frequency automatic gain control amplifier and a filter, and is converted into a digital signal via the analog to digital converter, which is then transmitted to the controller 100. Conversely, the digital signal transmitted from the controller 100 is converted by the transceiver 110 into an analog signal, which in turn is converted through a frequency filter into an intermediate signal. The display 130, preferably an LCD, displays the operational state of the terminal, the procedure of the execution program, and the message which demands registration according to the present invention. The key input device 140 includes a plurality of numeric keys and various functional keys to externally input key data to the controller.

Figure 2:
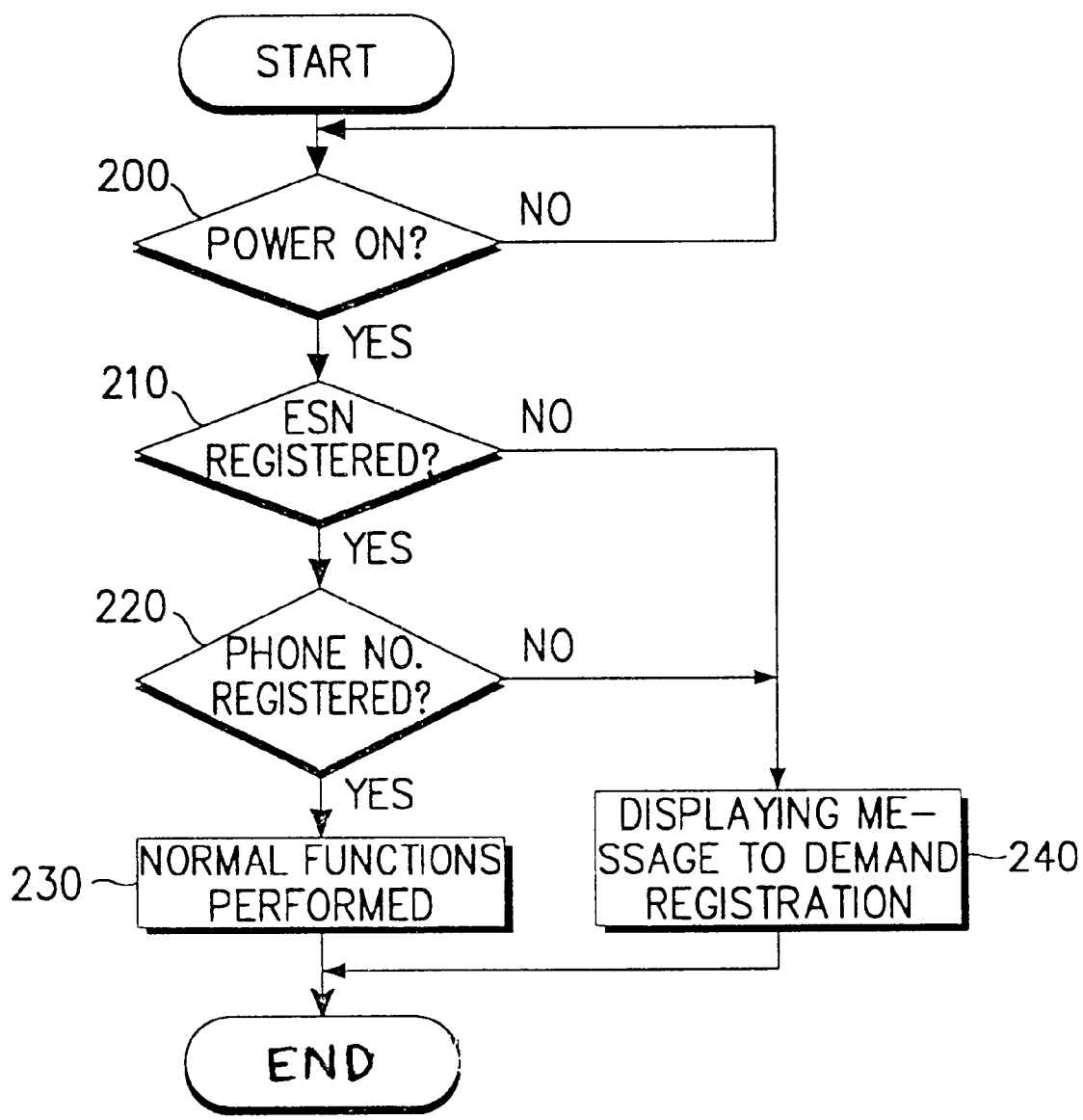
FIG. 2 is a flow chart illustrating the steps for displaying a message which demands registration on a WLL terminal in accordance with the present invention.

FIG. 2 illustrates the steps for displaying the message which demands registration on the display 130 of the terminal. In step 200 the controller 100 determines whether the power is turned on. If the power is turned on, the controller 100 then determines whether the ESN is stored in the EEPROM, thereby indicating the ESN is registered. If the ESN is not registered, a message is displayed on the display 130 which demands registration in step 240. If the ESN is registered, the controller determines, in step 220, whether a phone number is stored in the EEPROM, thereby indicating the phone number is registered. If the phone number is not registered, a message is displayed on the display 130 which demands registration in step 240. If the phone number is also registered, the controller 100 performs the normal functions of the terminal. In step 240, the controller 100 displays the message which demands registration on the display 130. The message may be displayed as, for example, "Please register the terminal!" and may optionally be accompanied by a beep through the speaker. Of course, any one of steps 210 or 220 may optionally be omitted since the registration of the terminal will generally result in assigning both the ESN and the phone number.

While the present invention has been described in connection with the specific embodiments herein and accompanied by the attached drawings, it will be readily appreciated by those skilled in the art that various changes in form and detail may be made thereto without departing from the spirit and scope of the present invention as defined by the appended claims.

What is claimed is:

1. A method of demanding registration of a wireless local loop terminal having a memory, a speaker, and a display, comprising the steps of:

determining whether said terminal's power is turned on;
   if said power is turned on, determining whether a registered identification data is stored in said memory; and
   if said registered identification data is not stored in said memory, displaying a register message on said display which demands user's initial registration of the terminal with a communication service provider.

2. A method as recited in claim 1, wherein said registered information data comprises an electronic serial number and a telephone number.

3. A method as recited in claim 1, wherein said registered information data is an electronic serial number.

4. A method as recited in claim 1, wherein said registered information data is a telephone number.

5. A method as recited in claim 1, further comprising the step of performing normal operational functions of said terminal when said registered identification data is stored in said memory.

6. A method as recited in claim 5, wherein said registered information data comprises an electronic serial number and a telephone number.

7. A method as recited in claim 5, wherein said registered information data is an electronic serial number.

8. A method as recited in claim 5, wherein said registered information data is a telephone number.

9. The method as recited in claim 1, further comprising the step of generating a warning signal through said speaker when said message is displayed on said display.

10. A method of demanding registration of a wireless local loop terminal having a memory, a speaker, and a display, comprising the steps of:

determining whether said terminal's power is turned on;
    if said power is turned on, determining whether an electronic serial number is stored in said memory;
    if said electronic serial number is not stored in said memory, displaying a register message on said display which demands user's initial registration of the terminal with a communication service provider;
    if said electronic serial number is stored in said memory, determining whether a telephone number is stored in said memory;
    if said telephone number is not stored in said memory, displaying a register message on said display which demands user's initial registration of the terminal with a communication service provider; and
    if said registered telephone number data is stored in said memory, performing normal operational functions of said terminal.

* * * * *